(12) United States Patent
Kiyamura et al.

(10) Patent No.: US 8,085,311 B2
(45) Date of Patent: Dec. 27, 2011

(54) OPTICAL APPARATUS WITH MOTOR DRIVE CONTROL SELECTED BASED ON ROTOR POSITION SENSOR OR DETERMINED TIME INTERVAL

(75) Inventors: Kousuke Kiyamura, Kawasaki (JP); Hiromu Yasuda, Kawasaki (JP); Chikara Aoshima, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 383 days.

(21) Appl. No.: 12/358,669

(22) Filed: Jan. 23, 2009

(65) Prior Publication Data

US 2009/0189990 A1 Jul. 30, 2009

(30) Foreign Application Priority Data

Jan. 25, 2008 (JP) ................. 2008-015531

(51) Int. Cl.
- *H04N 5/225* (2006.01)
- *H04N 5/232* (2006.01)
- *G03B 13/00* (2006.01)
- *G03B 3/10* (2006.01)
- *G03B 13/34* (2006.01)

(52) U.S. Cl. ............ 348/220.1; 348/345; 396/132
(58) Field of Classification Search .......... 396/132, 396/133, 135; 348/220.1
See application file for complete search history.

(56) References Cited

U.S. PATENT DOCUMENTS

| | | | | |
|---|---|---|---|---|
| 5,136,324 A | * | 8/1992 | Tsuboi et al. | 396/132 |
| 5,614,982 A | * | 3/1997 | Yasukawa | 396/95 |
| 5,815,742 A | * | 9/1998 | Hamada et al. | 396/55 |
| 6,603,929 B2 | * | 8/2003 | Ishikawa et al. | 396/133 |
| 2004/0057712 A1 | | 3/2004 | Sato et al. | |
| 2007/0279516 A1 | * | 12/2007 | Ishii | 348/345 |

FOREIGN PATENT DOCUMENTS

| | | |
|---|---|---|
| JP | 09-331666 | 12/1997 |
| JP | 10-062679 A | 3/1998 |
| JP | 2004-004362 | 1/2004 |

OTHER PUBLICATIONS

The above reference was cited in a Mar. 24, 2011 Chinese Office Action, enclosed with an English Translation, that issued in Chinese Patent Application No. 200910001189.5.

The above reference was cited in a Oct. 4, 2011 Japanese Office Action, a copy of which is not enclosed, that issued in Japanese Patent Application No. 2008-015531.

* cited by examiner

*Primary Examiner* — Albert Cutler
(74) *Attorney, Agent, or Firm* — Cowan, Liebowitz & Latman, P.C.

(57) ABSTRACT

An optical apparatus having a recording mode that is switchable between motion picture recording and still picture recording includes an optical element, a motor that includes a rotor having a magnet, and a stator having a coil configured to provide a rotational force to the magnet, the motor being configured to drive the optical element, a position sensor configured to detect a position of the rotor of the motor, and a driving circuit configured to select, in accordance with the recording mode, first driving configured to switch an electrization to the coil in the motor in accordance with a determined time interval, or second driving configured to switch an electrization to the coil in the motor in accordance with an output of the position senor.

3 Claims, 13 Drawing Sheets

OPTICAL APPARATUS WITH MOTOR DRIVE CONTROL SELECTED BASED ON ROTOR POSITION SENSOR OR DETERMINED TIME INTERVAL

BACKGROUND OF THE INVENTION

1. Field of the Invention

The present invention relates to an optical apparatus, and more particularly to an optical apparatus that has a recording mode that is switchable between motion picture recording and still picture recording.

2. Description of the Related Art

A camera that can provide both motion picture photography and still picture photography, such as a digital video camera that has a function of taking a still picture and a digital still camera that has a function of taking a motion picture. In general, voices are simultaneously recorded in the motion picture photography. At that time, it is necessary to prevent recording operational noises from a motor that is driving an optical element, such as a focus lens and a zoom lens. In addition, in the still picture photography, it is necessary to drive the optical element and to instantly prepare for a photography action so as not to miss the photography timing.

Japanese Patent Laid-Open No. 2004-004362 discloses a digital camera that can provide both the motion picture photography and the still picture photography. This digital camera drives a stepping motor that moves a lens, by using a two-phase excitation driving method in the still picture photography. In the motion picture photography, the stepping motor is driven by a micro step driving method that promotes silent driving of the stepping motor, and reduces operational noises of the motor to be recorded in the motion picture photography.

Japanese Patent Laid-Open No. 09-331666 is another prior art.

However, the stepping motor when driven at a high velocity cannot maintain synchronization between a driving pulse and rotor's rotations and is likely to step out. In an attempt of high-velocity driving using the stepping motor, it is conceivable to use a motor with a large step width or to lower a reduction ratio of a transmission mechanism. However, this scheme degrades a driving resolution of a lens, and it is difficult to drive the lens with high precision. In addition, in an attempt to obtain a high resolution necessary to drive a lens using the stepping motor, it is conceivable to use a motor with a small step width or to increase a reduction ratio of the transmission mechanism. However, this scheme lowers the driving velocity of the lens, and it is difficult to instantly prepare for a photography action.

SUMMARY OF THE INVENTION

The present invention provides an optical system configured to prevent recording of noises of a motor at the voice recording time, and to provide high-velocity lens driving at the non-voice recording time.

An optical apparatus according to one aspect of the present invention having a recording mode that is switchable between motion picture recording and still picture recording includes an optical element, a motor that includes a rotor having a magnet, and a stator having a coil configured to provide a rotational force to the magnet, the motor being configured to drive the optical element, a position sensor configured to detect a position of the rotor in the motor, and a driving circuit configured to select, in accordance with the recording mode, first driving configured to switch an electrization to the coil in the motor in accordance with a determined time interval, or second driving configured to switch an electrization to the coil in the motor in accordance with an output of the position senor.

Further features of the present invention will become apparent from the following description of exemplary embodiments with reference to the attached drawings.

DESCRIPTION OF THE EMBODIMENTS

First Embodiment

Figure 1:
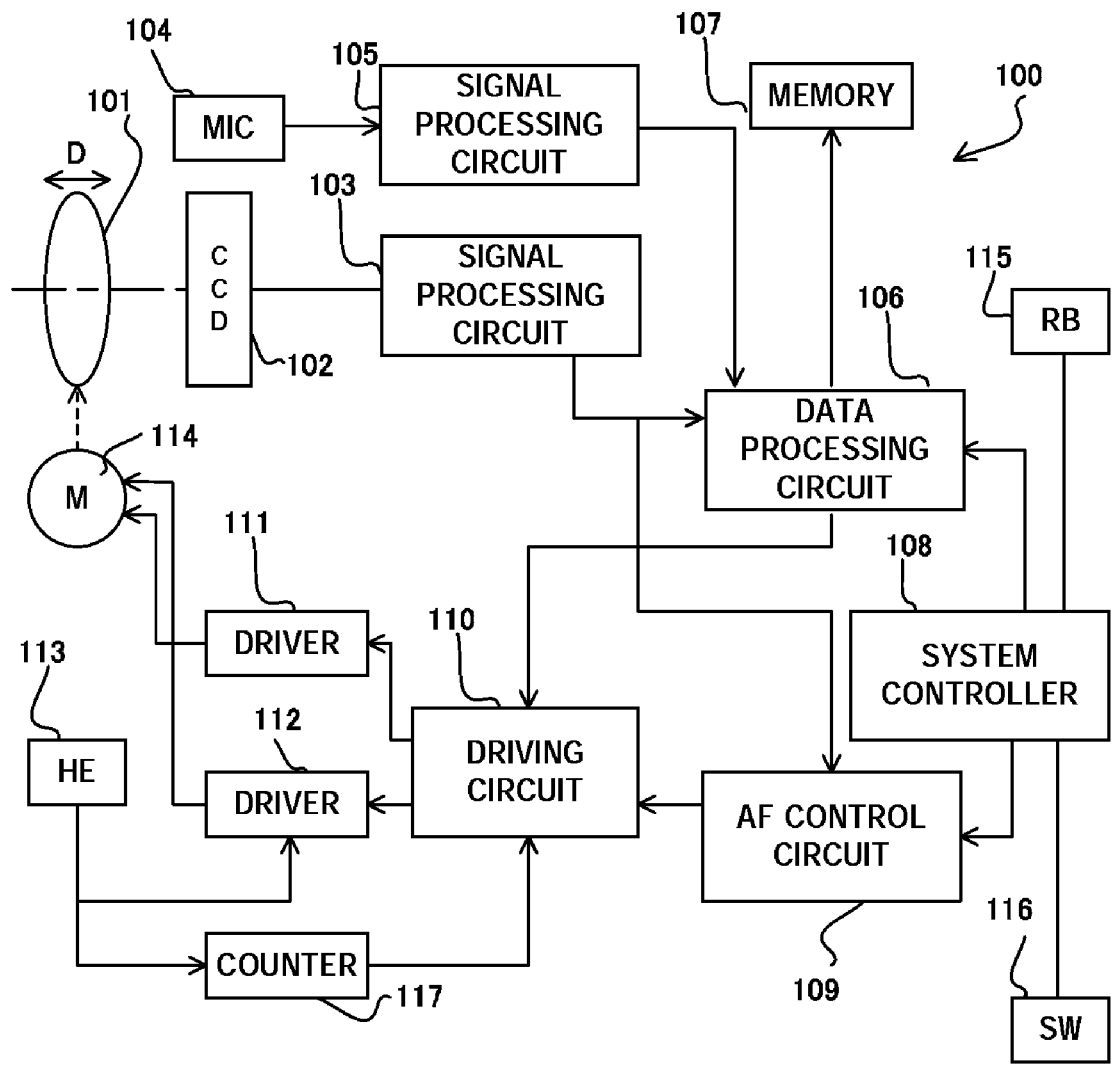
FIG. 1 is a block diagram of an optical apparatus according to a first embodiment.

FIG. 1 is a block diagram of an optical apparatus 100. The optical apparatus 100 generally refers to so-called a digital camera or a video camera which has a recording mode that is switchable between motion picture recording and still picture recording. The optical apparatus 100 includes an optical system, an image sensor 102, a first signal processing circuit 103, a microphone 104, a second signal processing circuit 105, a data processing circuit 106, a memory 107, a system controller 108, an autofocus (AF) control circuit 109, a motor driving system, a position sensor 113, a motor 114, a release button 115, and a still picture/motion picture ("SM") switch 116.

The optical system is a lens group or the like, and includes a focus lens (or lenses) 101 as an optical element. Light from a subject passes the optical system and enters the image sensor 102. The focus lens 101 is driven by the motor 114. An image magnification hardly changes even when the focus lens 101 finely reciprocates or wobbles in an optical-axis direction D, and only a focal length changes. Therefore, a focal point of an image formed on the image sensor 102 can be controlled by moving the focus lens 101 in the optical-axis direction D.

The image sensor 102 includes a photoelectric conversion element, such as a CCD or a CMOS sensor. An output signal obtained through the photoelectric conversion in the image sensor 102 is amplified by a first image processing circuit 103, and output as a digital video signal. More specifically, the first signal processing circuit 103 provides a gain control and performs a gamma process for an analogue electric signal output from the image sensor 102, and outputs the resultant signal as a digital video signal, such as RGB image data. The optical apparatus 100 forms a motion image or a static image by using this video signal. The first signal processing circuit 103 detects a contrast value of a screen based on a signal that has been converted into an electric signal by the image sensor 102, and thereby a focus state of the focus lens 101 can be recognized.

If necessary, an AF sensor of an external ranging method or a phase difference detection method may be provided. The AF sensor of the external ranging method detects the light from the subject, and outputs a detection signal. For example, the AF sensor emits the infrared light to the subject by using an infrared light emitting element (IrLED). It receives the infrared light reflected on the subject through its light receiving element, and detects a focus state of the optical system based on an output of the light receiving element. The AF sensor may be a sensor that irradiates an ultrasonic wave onto the subject, and detects a reflected wave. In addition, in case of the AF sensor of the phase difference detection method, the light from the subject may be split into two luminous fluxes, and a pair of AF sensors may detect the respective images. The light from the subject may be directly detected or a method for splitting and detecting the light incident upon the optical system 110 may be used. Thus, the AF sensor may detect a distance to the subject for the external ranging method, or an interval or shift amount between two images generated from the luminous flux from the subject for the phase-difference detection method.

The phase-difference detection method splits a luminous flux from a subject, introduces the two split luminous fluxes into two AF sensors, and calculates a defocus amount based on a shift amount or interval between two images output from these sensors. The external ranging method is classified into an active method and a passive method. The active method irradiates an infrared ray or an ultrasonic wave to a subject, detects the reflected wave through a sensor, and measures a distance to the subject based on a time period necessary for the reflected wave to return and an irradiation angle. On the other hand, the passive method splits a luminous flux from a subject into two luminous fluxes, receives the split luminous fluxes with two light receiving sensors, and operates a correlation between signals from two sensors. The passive method operates the number of pixels of the line sensor which corresponds to a shift amount that maximizes the correlation, and obtains focusing information based on the shift amount on the triangulation principle.

The optical apparatus 100 of this embodiment uses the contract detection method. The contrast detection method extracts a high frequency component in a video signal output from an imaging section by reciprocating or wobbling the focus lens, moves the focus lens to a position that provides a maximum value, and obtains the on-focus state.

The microphone 104 converts an external voice to an electric signal, and outputs the electric signal. The second signal processing circuit 105 processes an electric signal output from the microphone 104, and outputs it as a voice signal. More specifically, the analogue electric signal output from the microphone 104 is gain-controlled and then output as a digital voice signal through the analogue-to-digital conversion.

The data processing circuit 106 performs a process, such as a data compression, a video signal output from the first signal processing circuit 103 and a voice signal output from the second signal processing circuit 105, and then records the resultant signal in the memory 107. One mode can be selected between two modes, i.e., a voice recording mode configured to record a voice signal, and a non-voice recording mode without recording the voice signal.

The memory 107 can record storage data output from the data processing circuit 106. A type of the memory 107 is not limited, and a variety of memories are usable, such as a memory card, a camera built-in memory, a tape, and a disc.

The system controller 108 controls the data processing circuit 106 and the AF control circuit 109 and executes a sequence for photography in accordance with a release signal output from a release button 115. At that time, the photography sequence is executed by switching a still picture mode for the still picture photography and a motion picture mode for the motion picture photography in accordance with a state of the SM switch 116.

At the still picture photography time, the data processing circuit 106 is controlled so as to record in the memory 107 a video signal obtained just after the release button 115 is pressed. At the motion picture photography time, the data processing circuit 106 is controlled so as to record in the memory 107 a video signal obtained from when the release button 115 is just pressed to when the release button 115 is pressed next time.

At the motion picture photography time, this embodiment sets the recording mode of the data processing circuit 106 to the voice recording mode so as to simultaneously record both a video signal and a voice signal. However, the non-voice recording mode may be selected at the motion picture photography time, or the voice recording mode may be selected at the still picture photography time. In addition, a recording mode that records only a voice signal may be provided, and a combination of recording of a video signal and a voice signal is not limited.

The AF control circuit 109 outputs a driving target signal that defines a driving target of the focus lens 101 based on a video signal output from the first signal processing circuit 103. In other words, the AF control circuit 109 detects a focus state based on a contrast value of an image formed by the optical system. More specifically, the AF control circuit 109 extracts a high frequency component of a video signal output from the first signal processing circuit 103, and compares it with a reference value. When determining that it is equal to or greater than the reference value, the AF control circuit 109 determines that the on-focus state is obtained. On the other hand, when determining that it is smaller than the reference value, the AF control circuit 109 determines that no on-focus state is obtained and outputs a target position of the focus lens 101 so as to obtain the maximum value of this high frequency component. If necessary, the AF control circuit 109 may serve to detect a focus state based on the measurement result of the above AF sensor. The AF control circuit 109 outputs a driving target signal to a first driver 111 or a second driver 112 via a driving circuit 110.

While this embodiment outputs a driving target signal as a target position of the focus lens 101, the driving target signal may output as a target velocity of the focus lens 101. In addition, while this embodiment uses the AF that uses the contrast detection method, the external ranging method or the phase difference detection method may be used for the AF as described above.

The motor driving system includes a driving circuit 110, a first driver 111, a second driver 112, and a counter 117.

The driving circuit 110 selects the driver 111 or the second driver 112 in accordance with the driving target signal of the focus lens 101 output from the AF control circuit 109, and outputs a driving signal of the motor 114. More specifically, the driving circuit 110 serves as a position detector that calculates a current position of the focus lens 101 from a count value output from the counter 117. Thereafter, it calculates a driving amount of the motor 114 by multiplying a difference between the current position of the focus lens 101 and the driving target signal by a predetermined coefficient.

While this embodiment calculates the current position of the focus lens 101 based on the detection signal output from the position sensor 113, an encoder may be used to detect the current position of the focus lens 101. Alternatively, the current position of the focus lens 101 may be calculated by integrating a driving amount calculated by the driving circuit 110. In addition, this embodiment outputs the driving signal as a driving amount of the motor 114, the driving signal may be output as a driving velocity of the motor 114.

The first driver 111 switches the electrization to the coil in the motor 114 in accordance with a determined time interval. The first driver 111 drives the motor 114 through non-feedback electrization switching driving in accordance with the driving signal output from the driving circuit 110. The non-feedback electrization switching driving will be described later.

The second driver 112 switches the electrization to the coil in the motor 114 in accordance with an output of the position sensor 113. The second driver 112 drives the motor 114 through feedback electrization switching driving (blushless driving) in accordance with a driving signal output from the driving circuit 110. The feedback electrization switching driving will be described later.

The position sensor 113 detects a rotor position in the motor 114, and outputs a detection signal. The motor 114 rotates in accordance with an output of the first driver 111 or the second driver 112.

Figure 4:
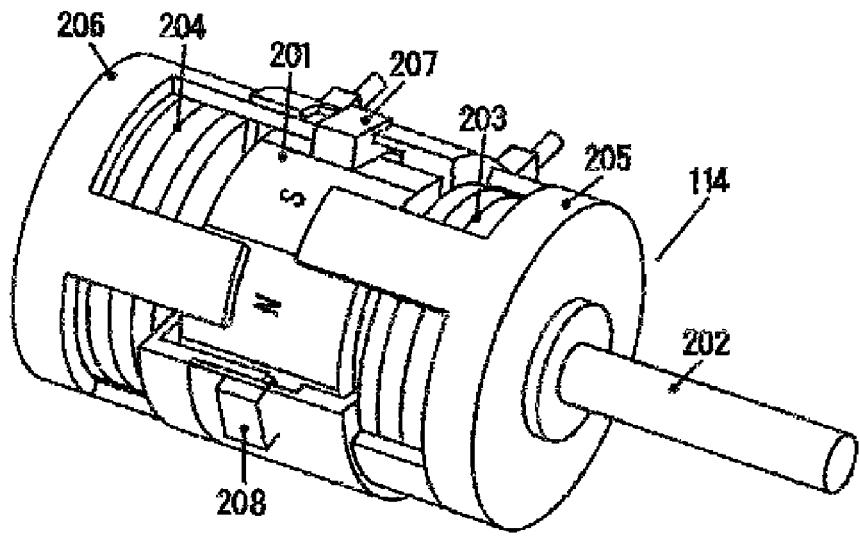
FIG. 4 is a perspective view of a motor and a position sensor shown in FIG. 1.

FIG. 4 is a perspective view of the motor 114 and the position sensor 113 with partially cutaway components for explanation convenience. The motor 114 is configured as disclosed in Japanese Laid-Open Patent No. 09-331666. The motor 114 includes a rotor 202 having a magnet 201, a first coil 203, a second coil 204, a first yoke 205, and a second yoke 206. The position sensor 113 includes a first position sensor 207, and a second position sensor 208. The first coil 203, the second coil 204, the first yoke 205, the second yoke 206, the first position sensor 207, and the second position sensor 208 constitute a stator.

The magnet 201 is a cylindrical permanent magnet having an outer circumference magnetized with multiple poles. The magnet 201 has a magnetized pattern in which the magnetic force has a sinusoidal strength in the radial direction with respect to an angular position. The rotor 202 is supported rotatably by the stator, and integrally fixed with the magnet 201. The first yoke 205 has a plurality of pole teeth excited by the first coil 203. A torque given to the rotor 202 can be varied by changing an excited pole. The second yoke 206 has a plurality of pole teeth excited by the second coil 204. A torque given to the rotor 202 can be varied by changing an excited pole. The first position sensor 207 and the second position sensor 208 are Hall elements configured to detect the magnetic flux of the magnet 201, and to output detection signals. Where n is the number of poles of the magnet 201, the electric angle 360° corresponds to 720/n° of the actual rotor angle.

This embodiment detects a magnetic flux of the rotor magnet through a Hall element. However, a method of detecting the rotor's position is not limited. A detection magnet that displaces along with a rotation of the rotor 202 may be arranged and detected, or an optical sensor may read a light shielding plate or a patterned surface. In addition, the position sensor may be integrated with and fixed onto the motor, or fixed onto a member separate from the motor.

The first driver 111 drives the motor 114 through the non-feedback electrization switching driving. The first driver 111 sequentially switches between the electrization to the first coil 203 and the electrization to the second coil 204 in accordance with the input driving pulse interval (driving frequency) and the rotational direction, thereby rotating the rotor 202 at a desired velocity. In addition, the first driver 111 can rotate the rotor 202 by a desired angle in accordance with the number of input driving pulses.

The first driver 111 can operate the motor 114 by micro step driving that is one type of the non-feedback electrization switching driving. When the voltage applied to the first coil 203 or the second coil 204 is stepwise changed, one step can be divided by micro step driving for positioning. This embodiment provides a pulse width modulation ("PWM") and stepwise changes the voltage. Since one step can be divided by the micro step driving for positioning, a high resolution and high controllability of a fine displacement are available.

In the non-feedback electrization switching driving, a rotational velocity is determined in accordance with an input driving pulse interval, and a precise velocity control is available by controlling the driving pulse interval. Stable control and silent low-velocity driving are available, particularly at the low-velocity driving time. In addition, since the acceleration/deceleration control is available by controlling a driving pulse interval, silent and moderate acceleration and deceleration can be obtained. However, when the pulse interval is made small (or when the driving frequency is made large), the rotor cannot respond to switching of the electrization to the coil, and the step out is likely to occur. Hence, it is necessary to provide a lower limit to the driving pulse interval and to expect a predetermined safety ratio to an actual load, and high-velocity driving is restricted.

The second driver 112 drives the motor 114 through the feedback electrization switching. The second driver 112 drives the motor 114 in accordance with the driving target signal of the focus lens 101 output from the AF control circuit 109. At that time, the second driver 112 sequentially switches the electrization to the first and the second coils 203 and 204 in accordance with the signal output from the first and second coils 203 and 204. Thereby, it is possible to rotate the rotor 202 by a desired angle. In addition, the rotor 202 can be rotated at a desired torque by controlling the currents that flow in the first coil 203 and the second coil 204.

The driver 112 can move the focus lens 101 faster than the driver 111. On the other hand, the driver 111 can position the focus lens 101 at an on-focus position more precisely than the driver 112.

The counter 117 outputs a count value by counting a detection signal output from the position sensor 113.

When a user presses the release button 115, the release button 115 outputs a release signal and directs the photography timing to the camera. When the user manipulates the SM switch 116, the SM switch 116 switches between the still picture mode and the motion picture mode.

Figure 2:
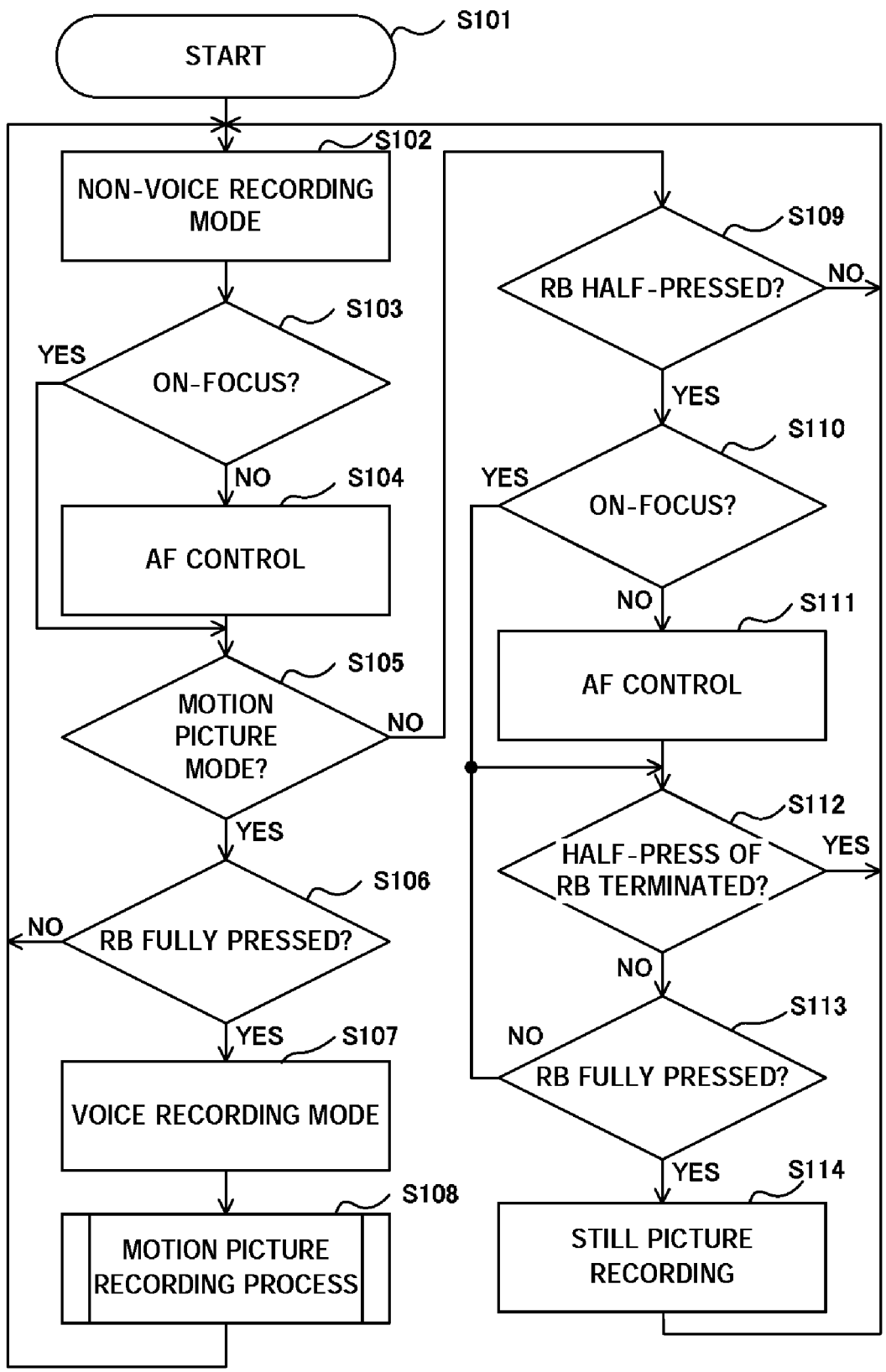
FIG. 2 is a flowchart of a photography process of the optical apparatus shown in FIG. 1.

FIG. 2 is a flowchart of a photography process of the optical apparatus 100.

When the photography process starts (S101), the recording mode of the data processing circuit 106 is set to the non-voice recording mode (S102). Thereafter, the AF control circuit 109 determines whether or not it can recognize an on-focus state (S103), and when determining that no on-focus state has yet been obtained, the AF control circuit 109 provides the AF control (S104). Next, it is determined that whether the optical apparatus 100 is set to the motion picture mode (S105). When the optical apparatus 100 is set to the motion picture mode, whether the release button 115 is fully pressed is determined (S106), and if not the flow returns to the top. When the release button 115 is fully pressed, the recording mode of the data pressing circuit 106 is set to the voice recording mode (S107), and the motion picture recording process follows (S108). The motion picture recording process will be described later.

When the optical apparatus 100 is set to the still picture mode, it is determined whether the release button 115 is half-pressed (S109), and if not the flow returns to the top. When the release button 115 is half-pressed, the AF control circuit 109 determines whether or not it can recognize an on-focus state (S110), and when determining that no on-focus state has yet been obtained, the AF control circuit 109 provides the AF control (S111). Next, whether the half-press of the release button 115 is terminated is determined (S112), and if so the flow returns to the top. When the half-press of the release button 115 is terminated, it is determined whether the release button 115 is not fully pressed (S113), and if not it is again determined whether the half-press of the release button 115 is terminated (S112). When the release button 115 is fully pressed, the still picture recording follows (S114).

Figure 3:
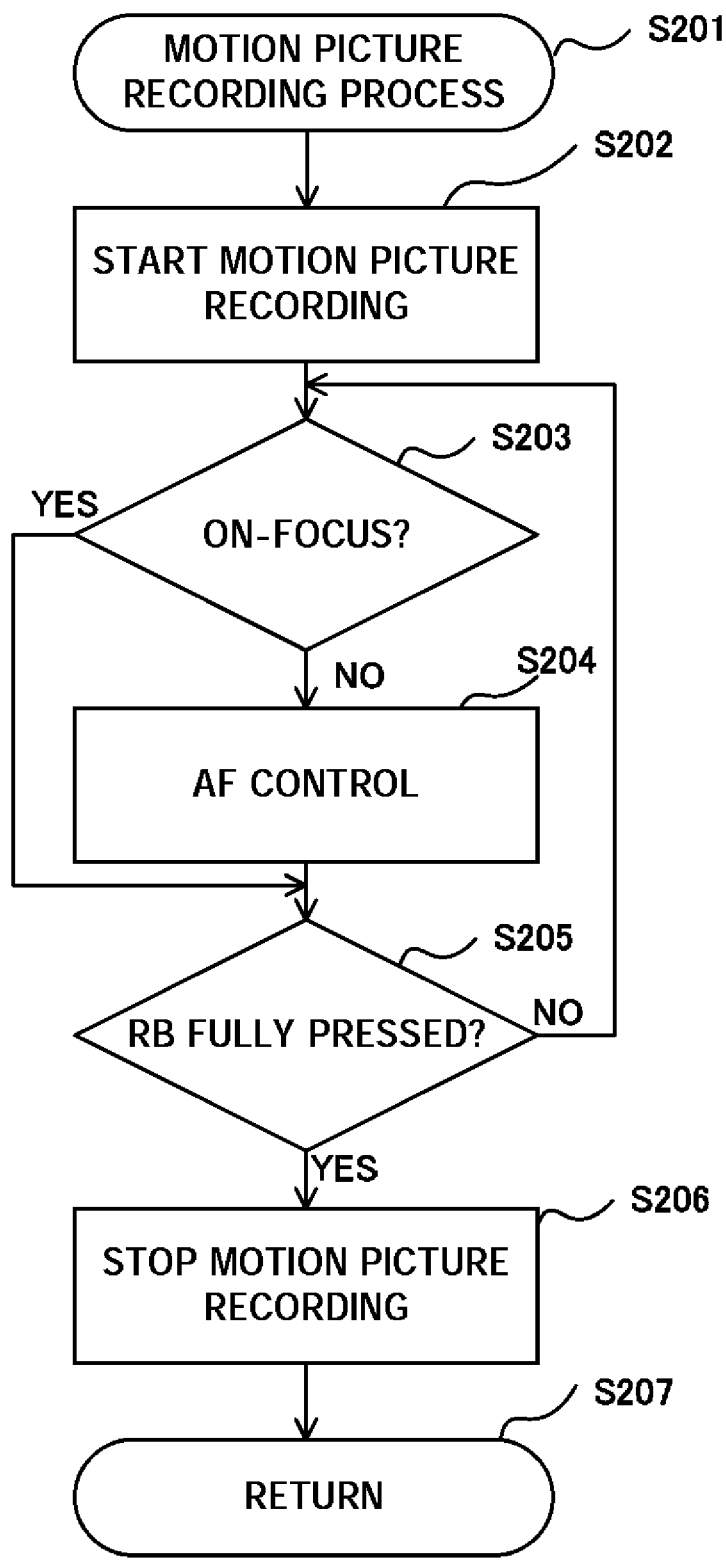
FIG. 3 is a flowchart showing details of a motion picture recording process in the step S108 shown in FIG. 2.

FIG. 3 is a flowchart of details of the motion picture recording process of the step S108. When the motion picture recording starts (S201), the data processing circuit 106 instructs the memory 107 to start recording a motion image (S202). Thereafter, the AF control circuit 109 determines whether or not it can recognize an on-focus state (S203), and when determining that no on-focus state has yet been obtained, the AF control circuit 109 provides the AF control (S204). Next, it is determined whether the release button 115 is fully pressed (S205), and if not the AF control circuit 109 again determines whether or not it can recognize an on-focus state (S203). When the release button 115 is fully pressed, the data processing circuit 106 stops motion picture recording (S206), and the motion picture recording process ends and the flow returns to the normal operation (S207). The above process enables the optical apparatus 100 to record a still picture and a motion picture including voices.

Figure 5:
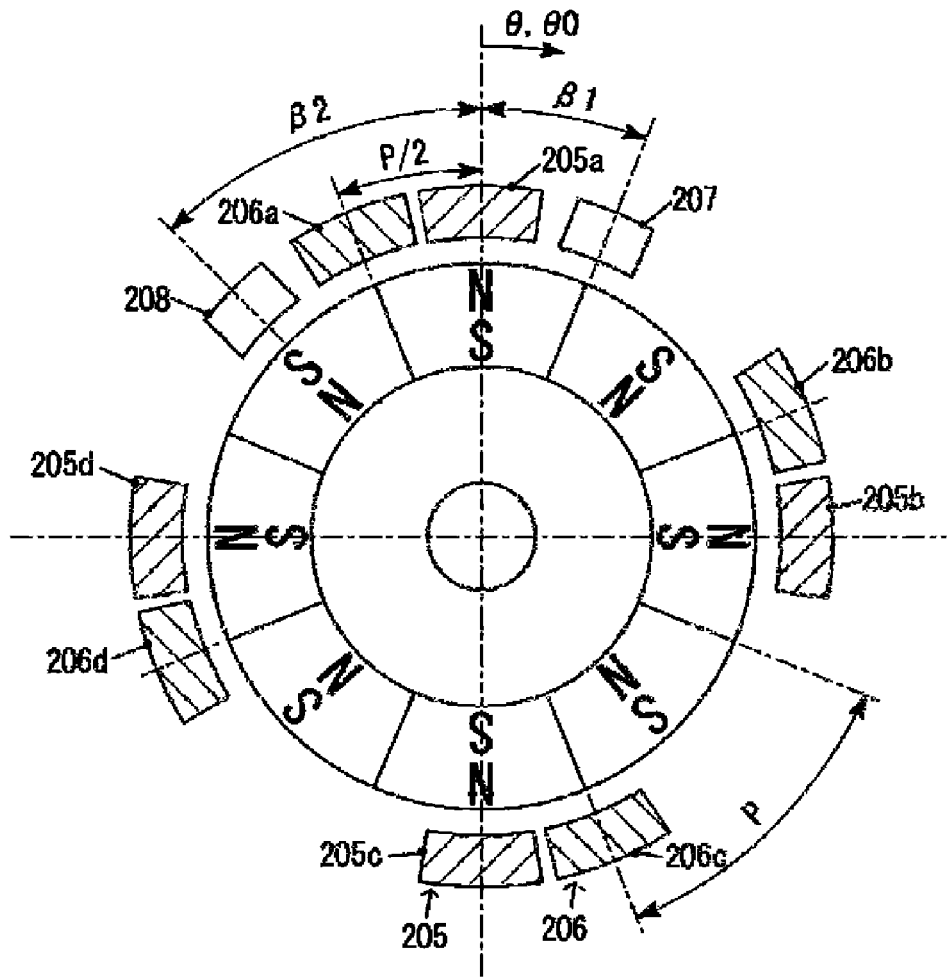
FIG. 5 is a sectional view in an axial direction showing a phase relationship between yokes, position sensors, and a rotor shown in FIG. 4.

FIG. 5 is a sectional view in the axial direction showing a phase relationship among the yokes 205, 206, the position sensor 113, and the rotor 202, and FIG. 7 is a sectional view in the axial direction showing an operation of the feedback electrization switching mode. In FIGS. 5 and 7, the clockwise direction is a positive direction. 205a to 205d denote pole teeth of the first yoke 205, and 206a to 206d are pole teeth of the second yoke 206. In this embodiment, the magnet has 8 poles with a magnetization angle P of 45°. In addition, when the first yoke 205 is used as a reference, the phase P/2 of the second yoke 206 is −22.5°, the first position sensor 207 has a phase β1 of +22.5°, and the second position sensor 208 has a phase β2 of −45°.

The following description discusses an operation of the feedback electrization switching mode by using the electric angle. The electric angle is expressed on the assumption that one period of the magnet's power is 360°, and an electric angle θ is expressed as follows where M is the rotor's pole number, $\theta_o$ is an actual angle:

$$\theta = 2 \times \theta_o / M \qquad \text{EQUATION 1}$$

Each of a phase difference between the first yoke 205 and the second yoke 206, a phase difference between the first position sensor 207 and the second position sensor 208, a phase difference between the first yoke 205 and the first position sensor 207 is an electric angle of 90°. In FIG. 5, the first yoke's pole teeth center opposes to the magnet's N pole center. Assume that this state is the rotor's initial state, and an electric angle is 0°.

Figure 6:
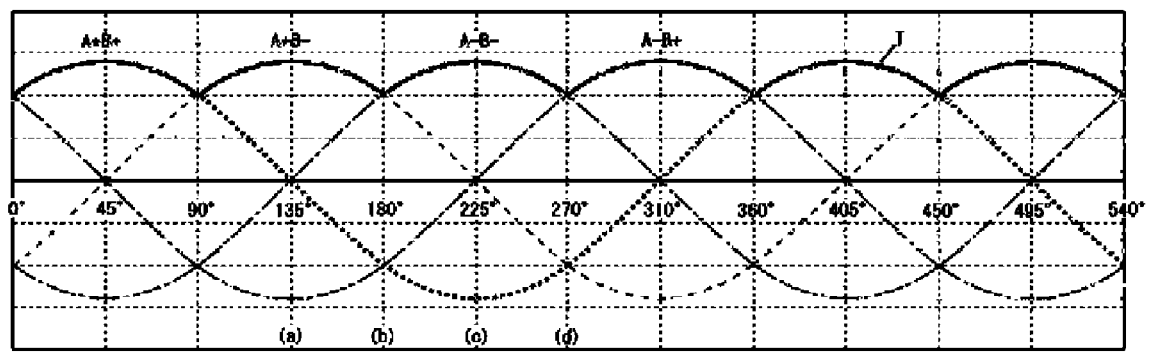
FIG. 6 is a graph showing a relationship between a rotational angle of the rotor shown in FIG. 5 and a motor torque, and a graph showing a relationship between the rotational angle of the rotor and the sensors' outputs.
Figure 6:
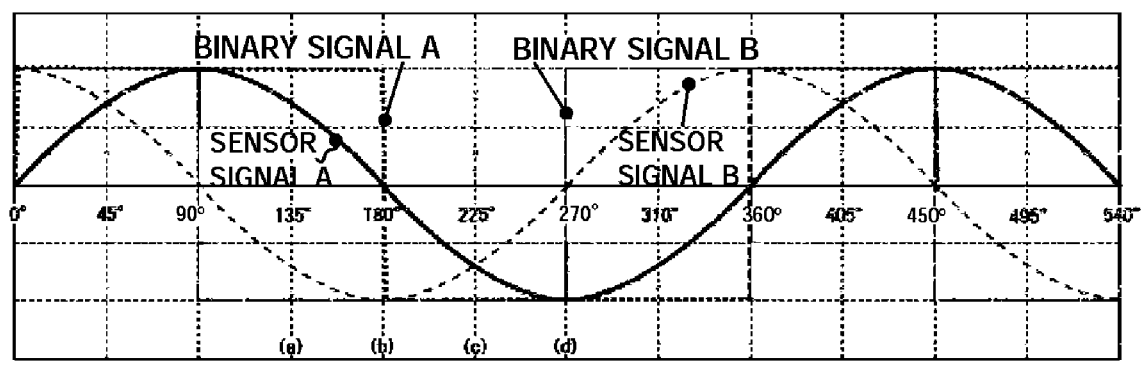

FIG. 6(1) is a graph showing a relationship between a rotational angle of the rotor 202 and the motor torque, where the abscissa axis denotes an electric angle and the ordinate axis denotes a motor torque. Assume that a motor torque that rotates the rotor 202 clockwise is positive. When the current in the positive diction is flowed in the first coil 203, the first yoke 205 is magnetized with an N pole, and an electromagnetic force is generated between the first yoke 205 and the magnetic pole of the magnet. When the current in the positive direction is flowed in the second coil 204, the second yoke 206 is magnetized with an N pole, and an electromagnetic force is generated with the second yoke 206 and the magnetic pole of the magnet. When two electromagnetic forces are synthesized, a schematically sinusoidal torque is obtained as the rotor 202 rotates (torque curve A+B+). In other electrization states, similarly schematically sinusoidal torques are obtained (torque curves A+B−, A−B−, A−B+). In addition, the first yoke 205 is arranged relative to the second yoke 206 with a phase of an electric angle of 90°, and thus four torques have phase differences of an electric angle of 90°.

FIG. 6(2) is a graph showing a relationship between the rotational angle of the rotor 202 and the sensor output, where the abscissa axis denotes an electric angle, and the ordinate axis denotes an output of a position sensor. The magnet 201 has a schematically sinusoidal magnetized pattern relative to the electric angle in the radial direction. Therefore, a schematic sine wave signal is obtained from the first position sensor 207 (position sensor signal A). In this embodiment, the first position sensor 207 outputs a positive value when arranged opposite to the N pole of the magnet 201. In addition, the second position sensor 208 is arranged with a phase of an electric angel of 90° relative to the first position sensor 207, and thus a cosine wave signal is obtained from the second position sensor 208 (position sensor signal B). In this embodiment, the second position sensor 208 inverts its polarity relative to the first position sensor 207, and thus outputs a positive value when arranged opposite to the S pole of the magnet 201.

Binary signals A and B are made by converting the position sensor signals A and B into binary forms. In the feedback electrization switching mode, the electrization to the first coil 203 is switched based on the binary signal A, and the electrization to the second coil 204 is switched based on the binary signal B. In other words, when the binary signal A is a positive value, the current in the positive direction is flowed in the first coil 203, and when the binary signal A is a negative value, the current in the reverse direction is flowed in the first coil 203. In addition, the current in the positive direction is flowed in the second coil 204 when the binary signal B is a positive value, and the current in the reverse direction is flowed in the second coil 204 when the binary signal B is a negative value.

Figure 7A:
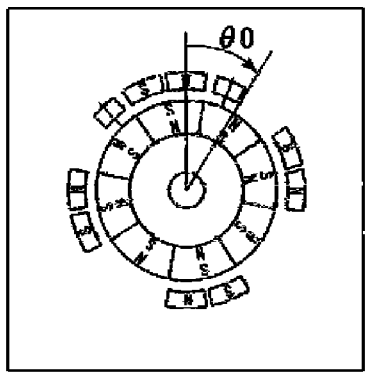
FIG. 7 is a sectional view in an axial direction showing an operation of a feedback electrization switching mode.

Next follows a description of an operation of the feedback electrization switching mode. FIG. 7 is a sectional view in the axial direction showing an operation of the feedback electrization switching driving. FIG. 7A shows a state in which the rotor 202 rotates by an electric angle of 135°. An output of each sensor is a value shown FIG. 6(2)(a), where a binary signal A is a positive value, and a binary signal B is a negative value. Therefore, the current flows in the first coil 203 in the positive direction, and the first yoke 205 is magnetized with the N pole, and the current flows in the second coil 204 in the reverse direction, and the second yoke 206 is magnetized with the S pole. At this time, a clockwise torque corresponding to a torque curve A+B− works, the rotor 202 rotates in response to a rotational force in the θ direction.

Figure 7B:
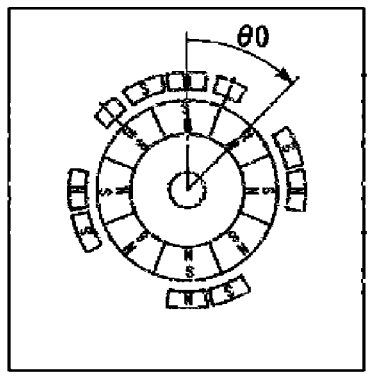
Figure 7B:
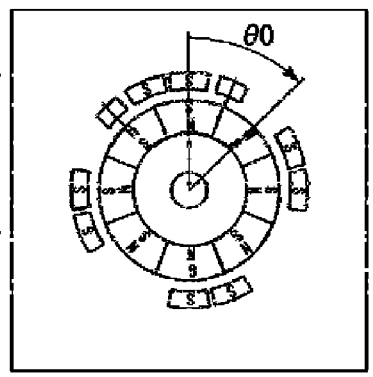

FIG. 7B shows a state in which the rotor 202 rotates by an electric angle of 180°. The first position sensor 207 is located at the boundary between the N pole and the S pole. Therefore, the binary signal A is switched from the positive value to the negative value at the boundary of the electric angle of 180°, and the electrization direction to the first coil 203 is switched from the positive direction to the reverse direction. This electric angle accords with the electric angle of the node between the torque curve A+B− and the torque curve A−B−.

FIG. 7B' shows a state in which the rotor 202 rotates by an electric angle of 180°, and the electrization direction to the first coil 203 is switched. The current flows in the first coil 203 in the reverse direction, and the first yoke 205 is magnetized with the S pole; the current flows in the second coil 204 in the reverse direction, and the second yoke 206 is magnetized with the S pole. At this time, a clockwise torque corresponding to the torque curve A−B− in FIG. 6(1) works, and the rotor 202 rotates in response to the rotational force in the 0 direction.

Figure 7C:
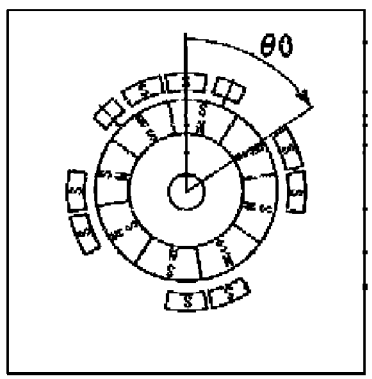

FIG. 7C shows a state in which the rotor 202 rotates by an electric angle of 225°. An output of each sensor has a value shown in FIG. 6(2)(c), and both the binary signals A and B have negative values. Therefore, the current in the negative direction flows in the first coil 203 and the first yoke 205 is magnetized with the S pole, and the current in the reverse direction flows in the second coil 204 and the second yoke 206 is magnetized with the S pole. At this time, a clockwise torque occurs corresponding to the torque curve A−B− shown in FIG. 6(1), and the rotor 202 rotates in response to the rotational force in the θ direction.

Figure 7D:
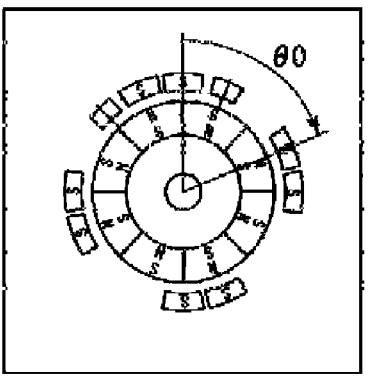
Figure 7D:
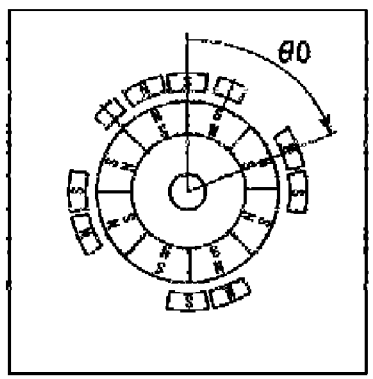

FIG. 7D shows a state in which the rotor 202 rotates by an electric angle of 270°. The second sensor 208 is located at the boundary between the N pole and the S pole. Therefore, at the boundary of an electric angle of 270°, the binary signal B switches from a negative value to a positive value, and the electrization direction of the second coil 204 is switched from the reverse direction to the positive direction. This electric angle accords with an electric angle of the node between the torque curve A−B− and the torque curve A−B+.

FIG. 7D' shows a state in which the rotor 202 rotates by an electric angle of 270°, and the electrization direction to the second coil 204 is switched. The current flows in the second coil 204 in the positive direction, and the second yoke 206 is magnetized with N pole; the current flows in the first coil 203 in the reverse direction, and the first yoke 205 is magnetized with the S pole. At this time, a clockwise torque corresponding to the torque curve A−B+ shown in FIG. 6(1) occurs, and the rotor 202 rotates in response to the rotational force in the θ direction.

By repeating the above operations, the rotor 202 can be rotated continuously. In addition, when positive and negative of the binary signal A or B are inverted, a reverse rotation is available.

It is possible to rotate the rotor 202 by a desired angle in the feedback electrization switching mode, by inputting the number of driving pulses and a rotational direction. In addition, by controlling the current that flows in the coil, a magnetic force between the pole tooth and the magnet's magnetic pole in each yoke can be changed, a rotational force applied to the rotor 202 can be controlled and the rotor 202 can be rotated at a desired velocity.

In the feedback electrization switching mode, a characteristic of the motor 114 can be changed by advancing a phase of a signal of the position sensor 113. A high-velocity rotation shortens an electrization switching period in the feedback electrization switching mode. A short electrization switching period delays a leading edge of the current value in comparison with the electrization switching period that has not been shortened due to the inductance influence of the coil, and the torque becomes lower. However, a fast phase of the signal of the position sensor can prevent a delay of the current value and restrain a decrease of the torque at the high velocity rotations.

The feedback electrization switching mode switches the electrization at the electric angle corresponding to a node of each torque curve, and can maximize the torque obtained from the motor 114 (FIG. 6(1), torque curve T).

In the non-feedback electrization switching mode, when the driving frequency is made high, a rotation of the rotor 202 cannot follow the electrization switching, and may cause stepping out. However, the feedback electrization switching mode switches the electrization while detecting a position of the rotor 202, and thus stepping out is unlikely to occur under proper control. Therefore, a restriction of the driving velocity and an expectation of the safety ratio, which are required for the non-feedback electrization switching mode, are unnecessary. The feedback electrization switching mode can provide faster and higher efficiency driving than the non-feedback electrization switching mode. The feedback electrization switching mode can control the velocity by controlling the current that flows in the coil, but needs to use a low current value at the low-velocity driving time, lowering the torque. Therefore, the positioning precision lowers at the low-velocity driving time.

Figure 8:
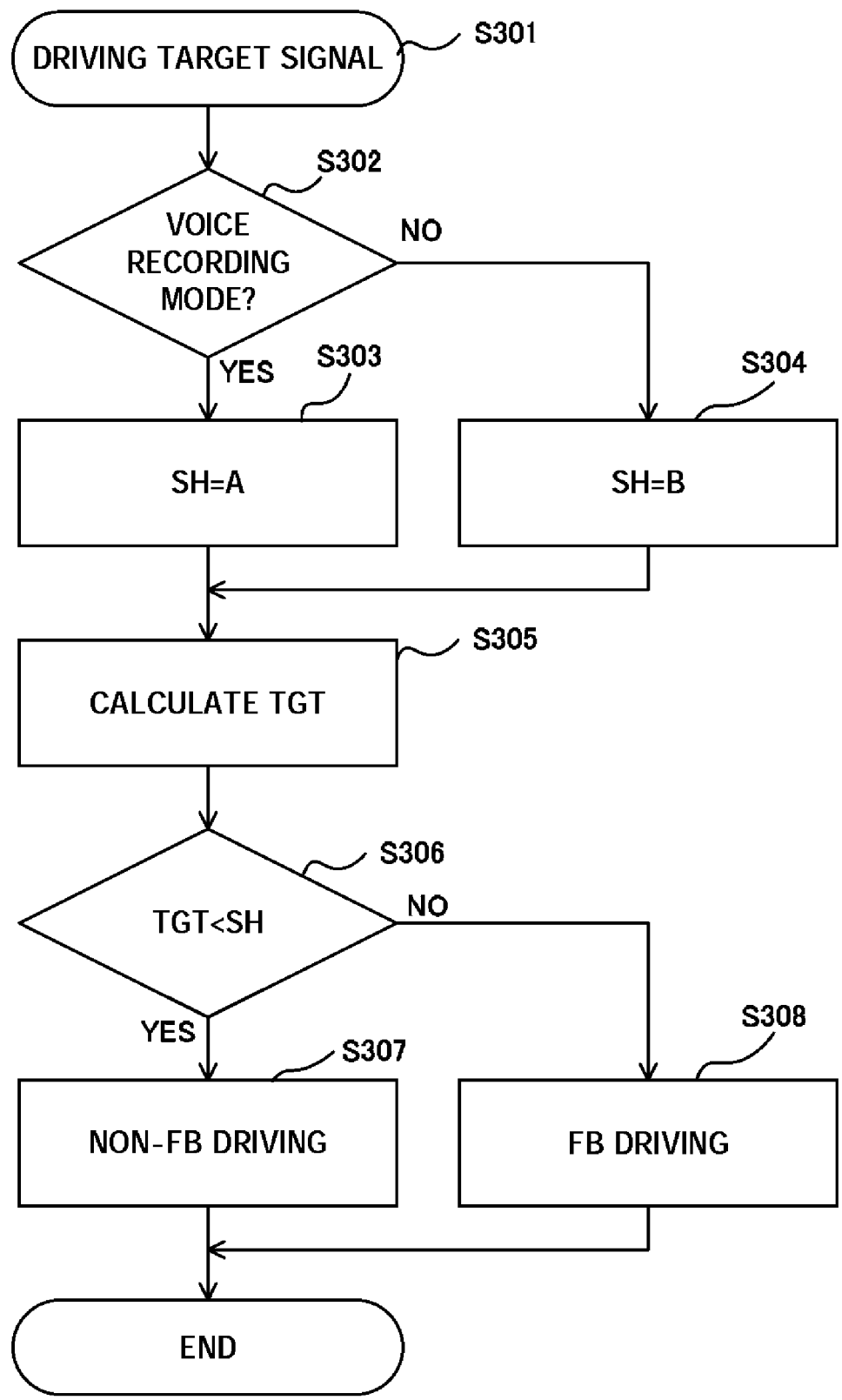
FIG. 8 is a flowchart of a lens driving process of the optical apparatus according to the first embodiment.

FIG. 8 is a flowchart of a lens driving process in this embodiment. When the driving target signal of the focus lens 101 output from the AF control circuit 109 is input to the driving circuit 110 (S301), the recording mode of the data processing circuit 106 is determined (S302). When the recording mode is set to the voice recording mode, a threshold SH is set to a predetermined threshold A (S303); when the recording mode is not set to the voice recording mode, the threshold SH is set to a predetermined threshold B (S304). The threshold A can be larger than the threshold B. Thereby, recording of motor noises in a wider range can be prevented. Next, when a target driving amount TGT of the motor 114 is calculated from the input driving target signal (S305), it is determined whether or not the target driving amount TGT is smaller than the threshold SH (S306). The target driving amount TGT is a difference between a target position of the focus lens 101 and a current position of the focus lens 101. When the target driving amount TGT is smaller than the threshold SH, a driving signal corresponding to the target driving amount TGT is output to the first driver 111, and the motor 114 is driven by the non-feedback electrization switching driving (S307). On the other hand, when the target driving amount TGT is equal to or greater than the threshold SH, a driving signal corresponding to the target driving amount TGT is output to the second driver 112, and the motor 114 is driven by the feedback electrization switching driving (S308). Thus, when the recording mode is the motion picture recording, the driving circuit 110 selects the first driver 111, and when the recording mode is the still picture recording, the driving circuit 110 selects the second driver 112. In either case, the focus lens 101 is driven in accordance with a driving target signal output from the AF control circuit 109. The above procedure enables the camera of this embodiment to drive the lens in accordance with the driving target and to provide AF control.

Figure 9:
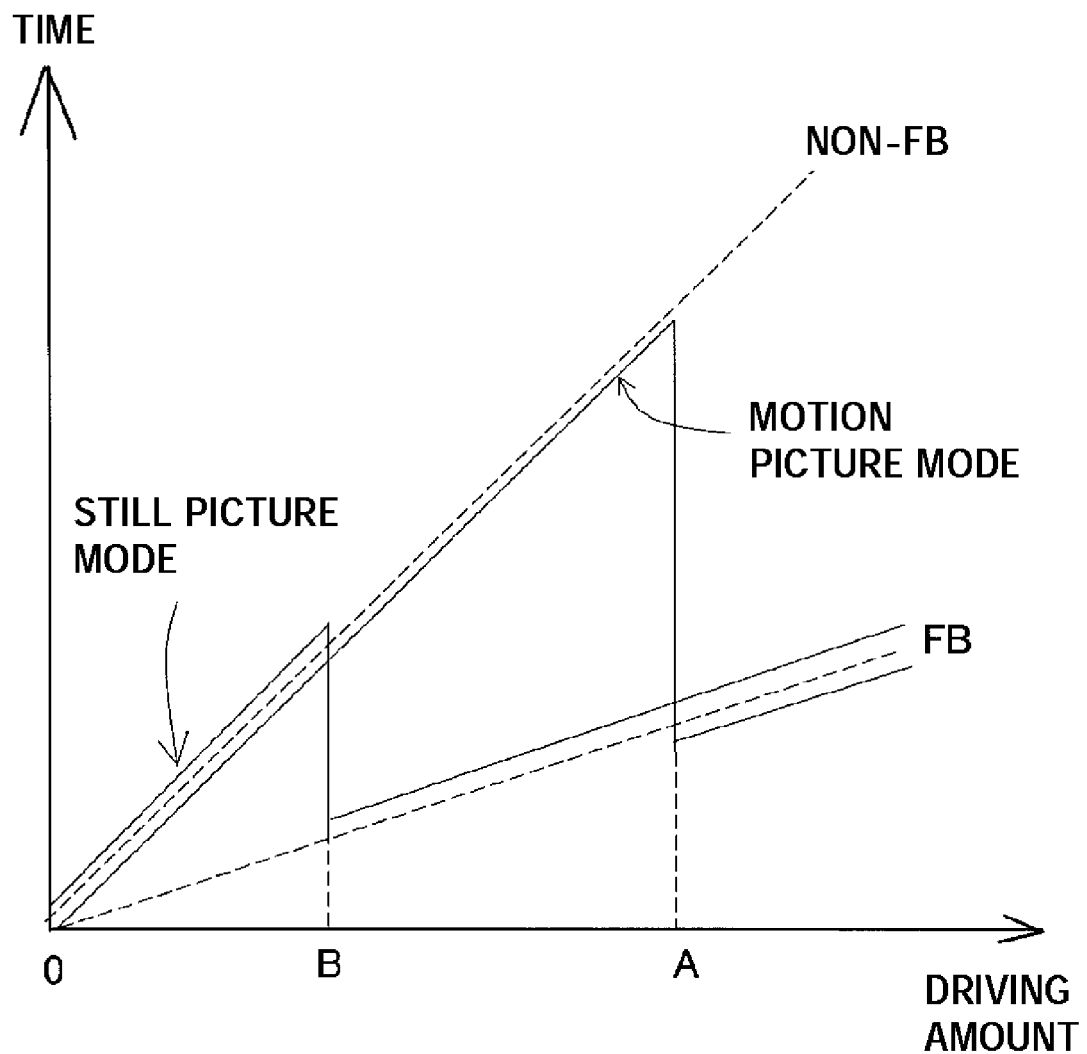
FIG. 9 is a graph showing a relationship between a driving amount and a driving time period according to the first embodiment.

FIG. 9 is a graph showing a relationship between a driving amount and a driving time period in this embodiment. The abscissa axis denotes the driving amount, and the ordinate axis denotes the time period taken for driving. A and B denote thresholds A and B. A dotted line shown by the non-FB denotes a relationship between a driving amount and a driving time period in the non-feedback electrization switching driving, and a dotted line shown by the FB denotes a relationship between a driving amount and a driving time period in the feedback electrization switching driving. The non-feedback electrization switching driving is slower than the feedback driving, and has a larger gradient.

The lens driving process of this embodiment provides the motion picture mode with the non-feedback electrization switching driving when the target driving amount is smaller than a threshold A and the feedback electrization switching driving when the target driving amount is equal to or larger than the threshold A. Therefore, in the motion picture mode, except when a moving amount is extremely large, this embodiment drives the lens by the non-feedback electrization switching driving in which silent driving is easy, and can reduce the operational noises. In addition, this embodiment provides the still picture mode with the non-feedback electrization switching driving when the target driving amount is smaller than a threshold B, and the feedback electrization switching driving when the target driving amount is equal to or greater than the threshold B. Therefore, a reduced driving time period and a shorter focusing time period are available in the still picture mode even when a moving amount is large.

Thus, this embodiment can prevent recording of the operating motor's noises at the voice recording time and high-velocity on-focus operation is available at the non-voice recording time in the optical apparatus 100 that can record an image and a voice.

Second Embodiment

Figure 10:
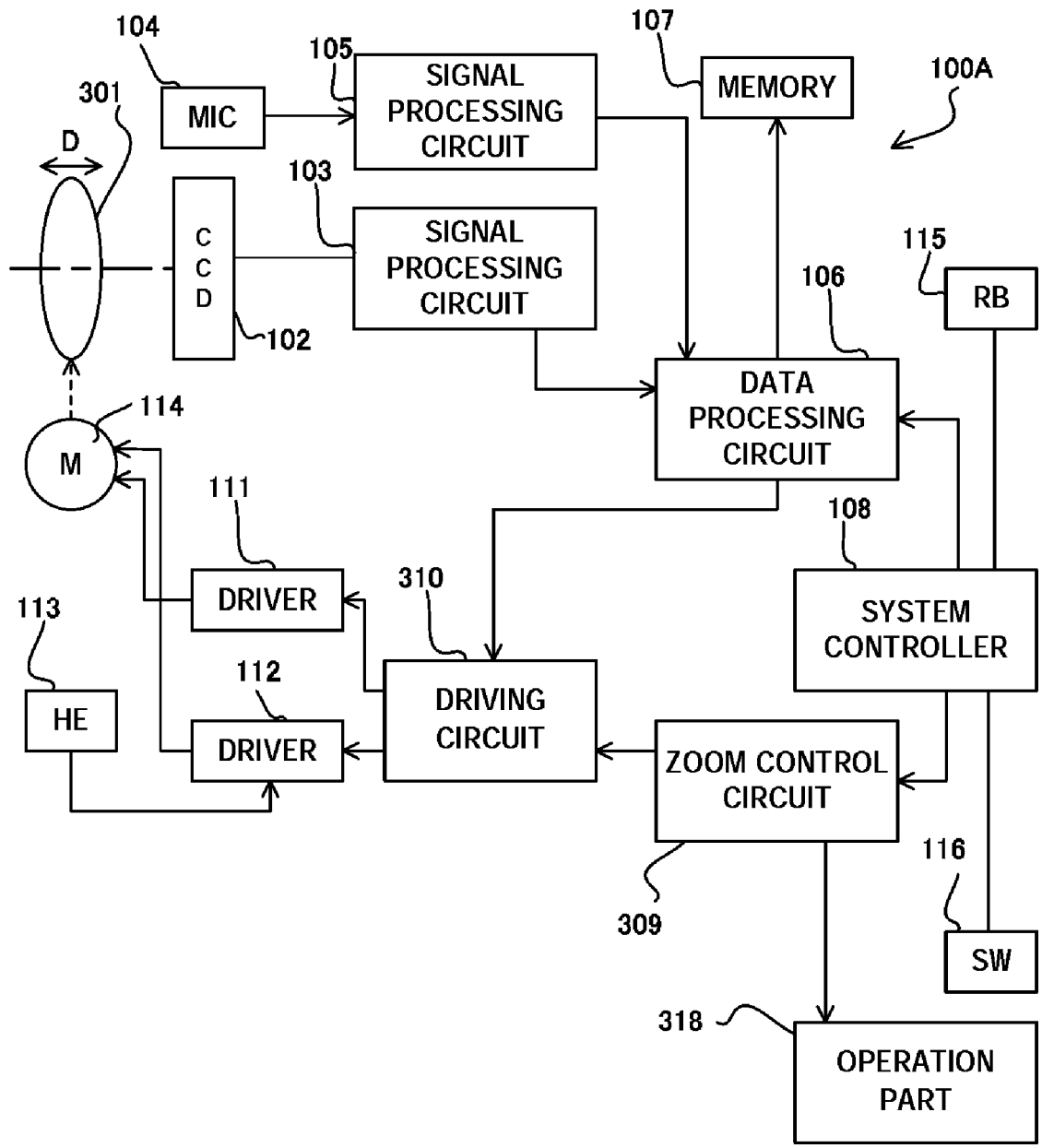
FIG. 10 is a block diagram of an optical apparatus according to a second embodiment.

Next follows a description of the second embodiment. A duplicate description of common part to the first embodiment will be omitted. FIG. 10 is an explanatory view showing a structure of an optical apparatus 100A according to the second embodiment.

301 denotes a zoom lens (optical element), which is driven in the optical-axis direction D by the motor 114 and can change a magnification variation state in the imaging surface of the image sensor 102. 309 denotes a zoom control circuit, which outputs a driving target signal of a zoom lens 301 based on an operational signal output from a zoom operation part 318. More specifically, a target velocity of the zoom lens 301 is output so that an operation direction of the zoom operation part 318 can correspond to a driving direction of the zoom lens 301 and an operation amount of the zoom operation part 318 can correspond to a driving velocity of the zoom lens 301. 310 denotes a driving circuit, which selects one of the first driver 111 and the second driver 112 in accordance with a driving target signal of the zoom lens 301 output from the zoom control circuit 309, and outputs a driving signal of the motor 114. More specifically, the driving velocity of the motor 114 is calculated by multiplying the driving velocity of the zoom lens 301 by a predetermined coefficient. 318 denotes the zoom operation part, which outputs an operation signal in accordance with an operation direction and an operation amount of the user.

Figure 11:
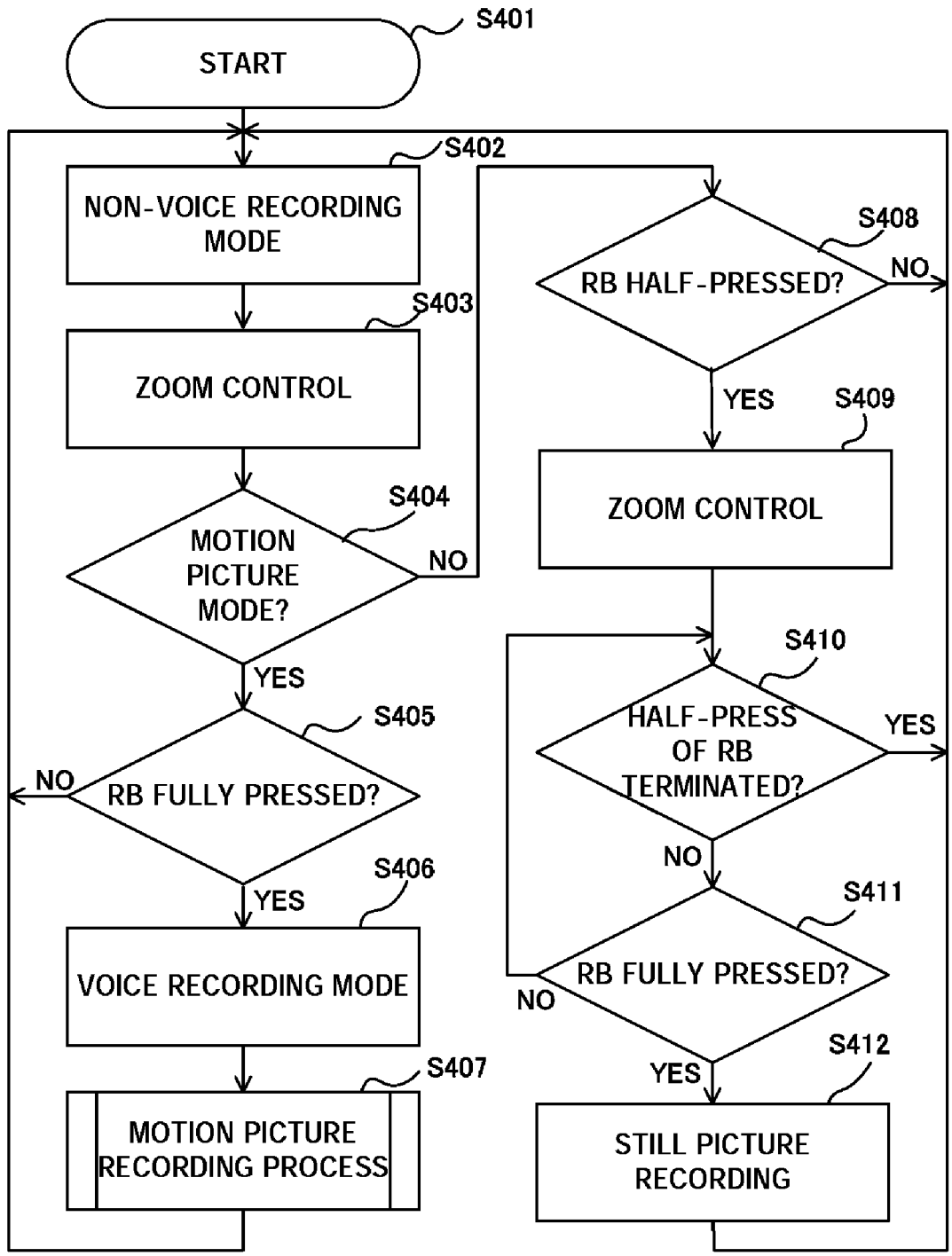
FIG. 11 is a flowchart of a photography process according to the second embodiment.

FIG. 11 is a flowchart showing a photography process of the optical apparatus 10A. When the photography process starts (S401), the recording mode of the data processing circuit 106 is set to the non-voice recording mode (S402). Thereafter, the zoom control circuit 309 provides zoom control (S403). Next, it is determines whether or not the camera is set to the motion picture mode (S404). When the optical apparatus 100A is set to the motion picture mode, it is determined whether the release button 115 is fully pressed (S405), and if not the flow returns to the top. When the release button 115 is fully pressed, the recording mode of the data pressing circuit 106 is set to the voice recording mode (S406), and the motion picture recording process follows (S407). The motion picture recording process will be described later. When the optical apparatus 100A is set to the still picture mode, it is determined whether the release button 115 is half-pressed (S408), and if not the flow returns to the top. When the release button 115 is half-pressed, the zoom control circuit 309 provides the zoom control (S409). Next, it is determined whether the half-press of the release button 115 is terminated (S410), if so the flow returns to the top. When the half-press of the release button 115 is not terminated, it is determined whether the release button 115 is fully pressed (S411), and when the release button 115 is not fully pressed, it is again determined whether the half-press of the release button 115 is terminated (S410). When it is fully pressed, the still picture recording follows (S412).

Figure 12:
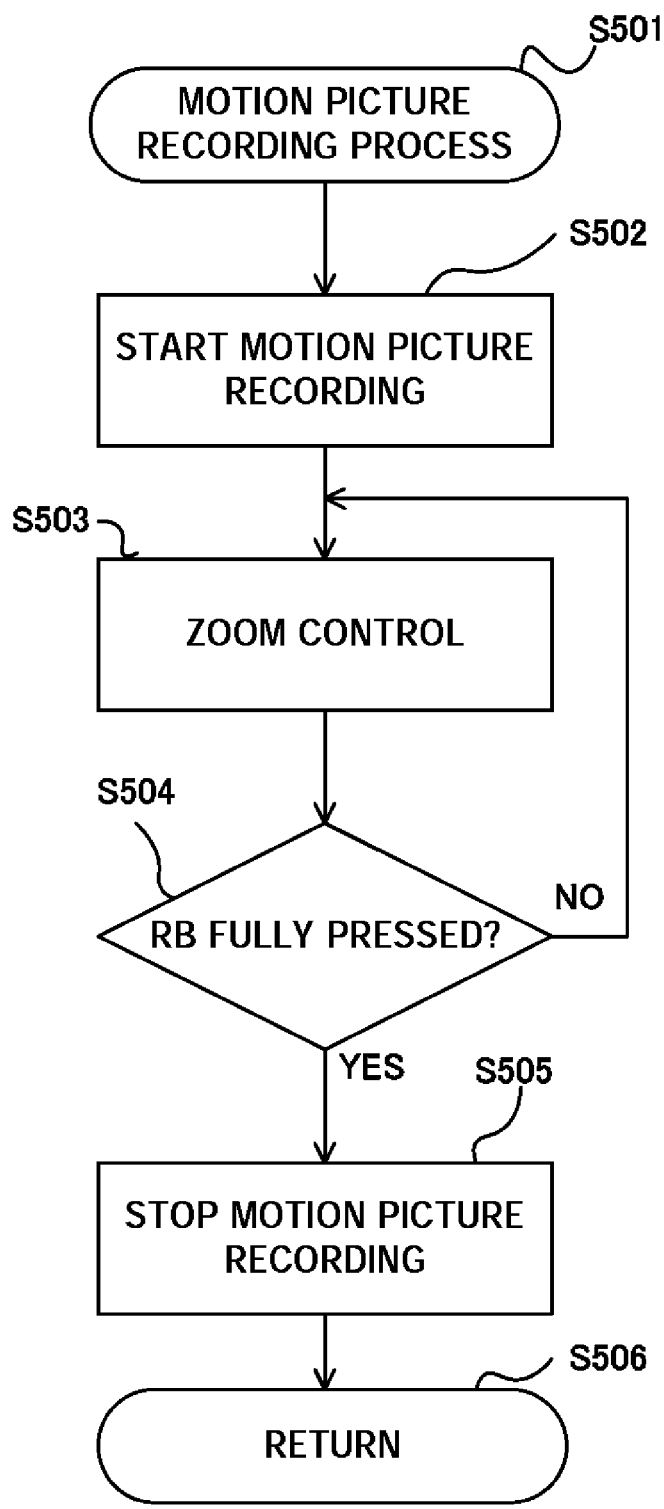
FIG. 12 is a flowchart of a motion picture recording process in the optical apparatus according to the second embodiment.

FIG. 12 is a flowchart of the motion picture recording process of the optical apparatus 100A. When the motion picture recording starts (S501), the data processing circuit 106 starts recording a motion image (S502). Thereafter, the zoom control circuit 309 provides the zoom control (S503). Next, it is determined whether the release button 115 is fully pressed (S504), and if not the zoom control circuit 309 again provides the zoom control (S503). When the release button 115 is fully pressed, the data processing circuit 106 stops recording the motion image (S505), and the motion picture recording process ends and the flow returns to the normal operation (S506).

By the above process, the optical apparatus 100A can record a still image and a motion image including voices.

Figure 13:
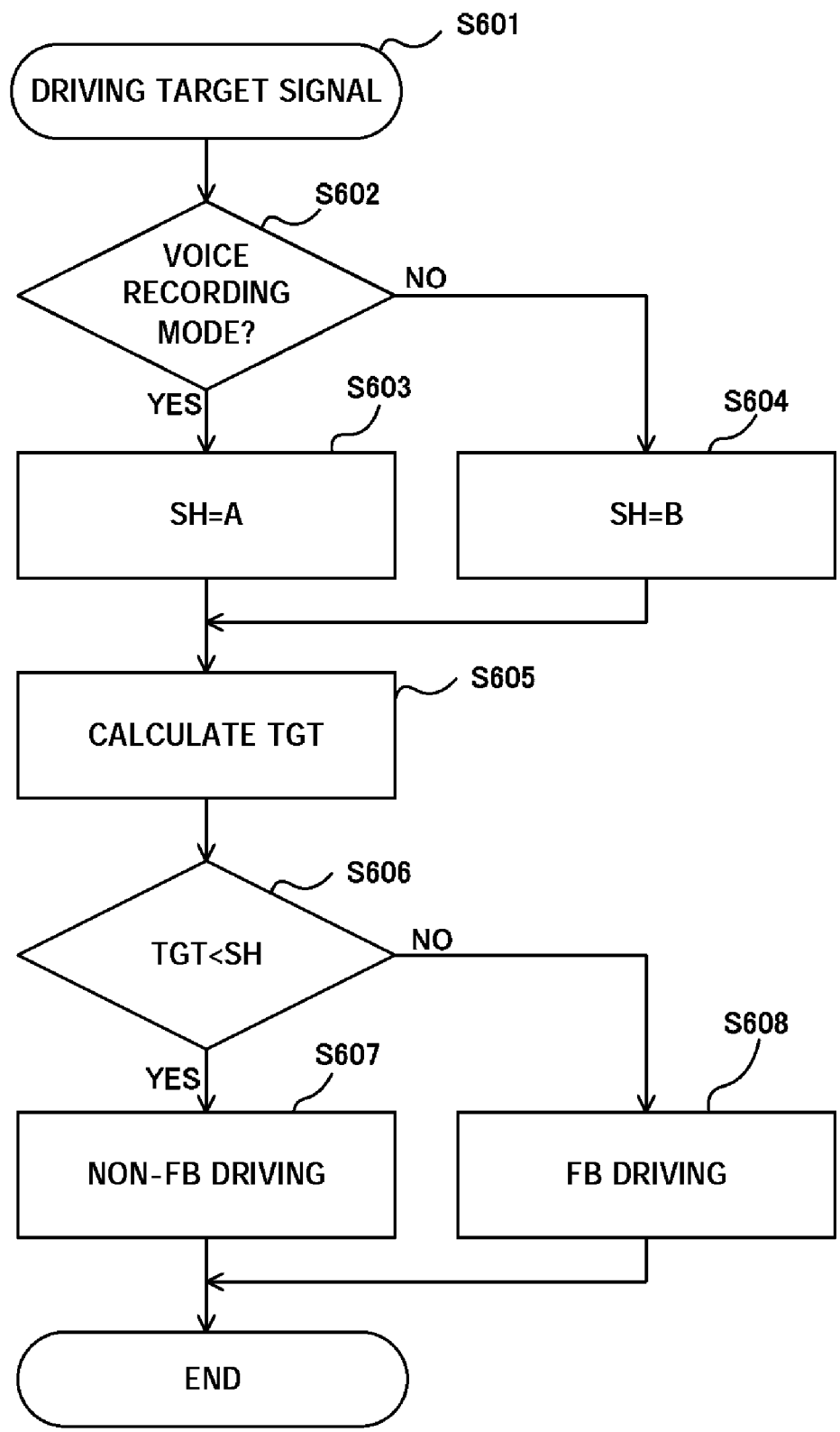
FIG. 13 is a flowchart of a lens driving process of the optical apparatus according to the second embodiment.

FIG. 13 is a flowchart of a lens driving process in this embodiment. When a driving target signal of the zoom lens 301 output from the zoom control circuit 309 is input to the driving circuit 310 (S601), the recording mode of the data processing circuit 106 is determined (S602). When the recording mode is set to the voice recording mode, a threshold SH is set to a predetermined threshold A (S603); when the recording mode is not set to the voice recording mode, the threshold SH is set to a predetermined threshold B (S604). The threshold A can be larger than the threshold B. Next, when a target velocity TGT of the motor 114 is calculated from the input driving target signal (S605), it is determined whether or not the target velocity TGT is smaller than the threshold SH (S606). When the target velocity TGT is smaller than the threshold SH, a driving signal corresponding to the target velocity TGT is output to the first driver 111, and the motor 114 is driven by the non-feedback electrization switching driving (S607). On the other hand, when the target velocity TGT is equal to or greater than the threshold SH, a driving signal corresponding to the target velocity TGT is output to the second driver 112, and the motor 114 is driven by the feedback electrization switching driving (S608). In either case, the zoom lens 301 is driven in accordance with a driving target signal output from the zoom control circuit 309.

The above procedure enables the optical apparatus 100A to drive the lens in accordance with the driving target and to provide the zoom control.

Figure 14:
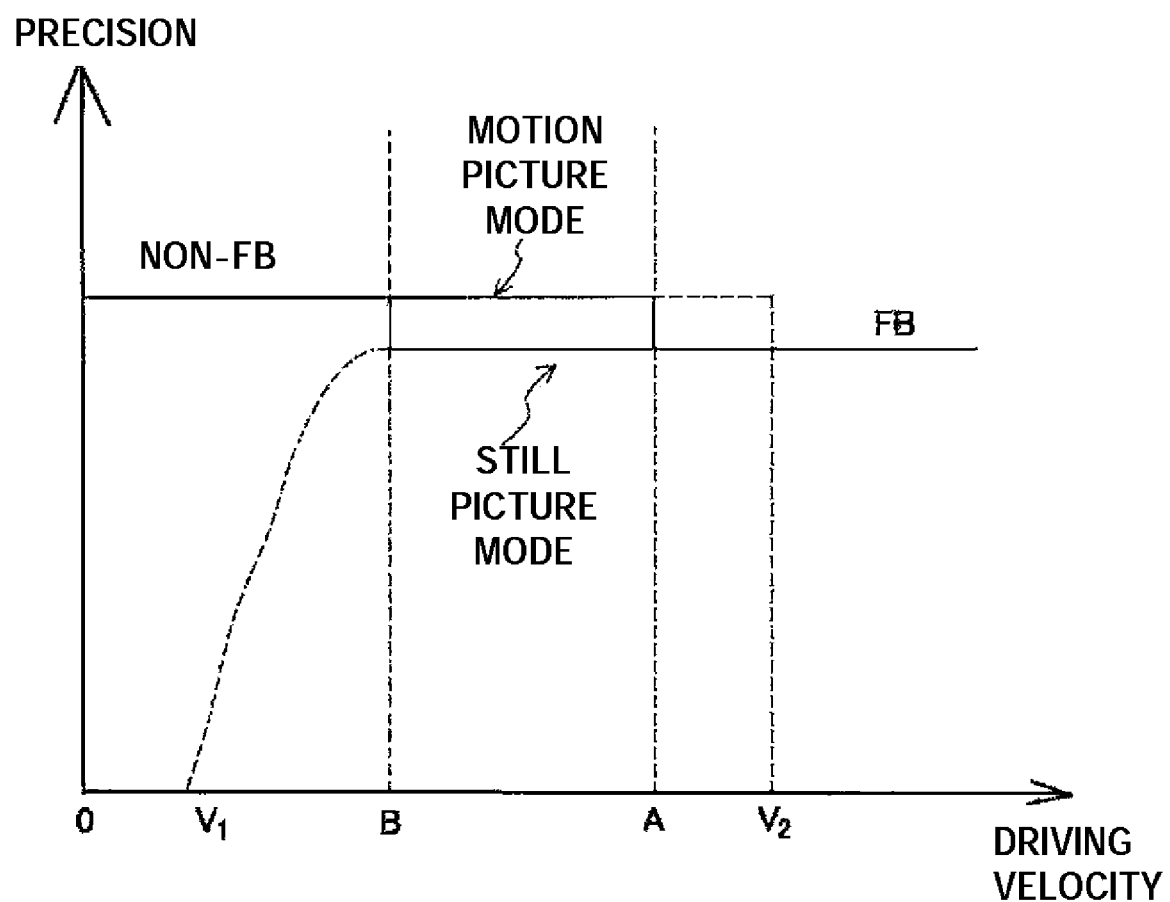
FIG. 14 is a graph showing a relationship between a driving velocity and driving precision.

FIG. 14 is a graph showing a relationship between a driving velocity and driving precision in this embodiment. The abscissa axis denotes the driving velocity, and the ordinate axis denotes the driving precision. A and B denote thresholds A and B. A dotted line shown by the non-FB denotes a relationship between the driving velocity and the driving precision in the non-feedback electrization switching driving, and a dotted line shown by the FB denotes a relationship between the driving velocity and the driving precision in the feedback electrization switching driving. In the non-feedback electrization switching driving, stepping out occurs with a stepping-out velocity V2 or higher, and thus a driving precision abruptly lowers. In addition, the feedback electrization switching driving, the velocity is controlled based on a current amount, and a torque lowers at the low-velocity driving time. Therefore, the driving precision gradually lowers at a low velocity, falls below the load torque at a velocity V1, and the lens stops.

The lens driving process of this embodiment provides the motion picture mode with the non-feedback electrization switching driving when the target velocity is smaller than a threshold A and the feedback electrization switching driving when the target velocity is equal to or larger than the threshold A. Therefore, in the motion picture mode, except when a target velocity is extremely large, this embodiment drives the lens by the non-feedback electrization switching driving in which silent driving is easy, and can reduce the operational noises.

In addition, in the still picture mode, this embodiment drives the lens by the non-feedback electrization switching driving when the target velocity is smaller than a threshold B, and by the feedback electrization switching driving when the target velocity is equal to or larger than the threshold B. Therefore, the lens is driven by the feedback electrification switching driving in the still picture mode, except when the target velocity is small, and high-velocity driving is available.

Thus, this embodiment can prevent recording of operational noises of the motor at the voice recording time and high-velocity zoom operation is available at the non-voice recording time in the optical apparatus 100A that can record an image and a voice.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-015531, filed on Jan. 25, 2008, which is hereby incorporated by reference herein in its entirety.

What is claimed is:

1. An optical apparatus having a recording mode for recording a motion picture and a recording mode for recording a still picture, said optical apparatus comprising:
   an optical element;
   a motor that includes a rotor having a magnet, and a stator having a coil configured to provide a rotational force to the magnet, the motor being configured to drive the optical element;
   a position sensor configured to detect a position of the rotor in the motor;
   a driving circuit configured to select, in accordance with the recording mode, first driving configured to switch an electrization to the coil in the motor in accordance with a determined time interval, or second driving configured to switch an electrization to the coil in the motor in accordance with an output of the position sensor;
   a control circuit configured to output, via the driving circuit, for the first driving or second driving a driving target signal that defines a target to which the optical element is driven, and
   a position detector configured to detect a current position of the optical element,
   wherein the driving circuit is configured to select the first driving or the second driving in accordance with the driving target signal,
   wherein the driving target signal defines a target position of the optical element,
   wherein the driving circuit selects the first driving when a target driving amount as a difference between the target position and the current position is smaller than a threshold, or the second driving when the target driving amount is equal to or larger than the threshold, and
   wherein the driving circuit sets a threshold when the recording mode is set to the recording mode for recording a motion picture larger than a threshold when the recording mode is set to the recording mode for recording a still picture.

2. The optical apparatus according to claim 1, wherein the driving circuit selects the first driving when the recording mode is set to the recording mode for recording a motion picture, and the second driving when the recording mode is set to the recording mode for recording a still picture.

3. An optical apparatus having a recording mode for recording a motion picture and a recording mode for recording a still picture, said optical apparatus comprising:
   an optical element;
   a motor that includes a rotor having a magnet, and a stator having a coil configured to provide a rotational force to the magnet, the motor being configured to drive the optical element;
   a position sensor configured to detect a position of the rotor in the motor;
   a driving circuit configured to select, in accordance with the recording mode, first driving configured to switch an electrization to the coil in the motor in accordance with a determined time interval, or second driving configured to switch an electrization to the coil in the motor in accordance with an output of the position sensor;
   a control circuit configured to output, via the driving circuit, for the first driving or second driving a driving target signal that defines a target to which the optical element is driven,
   wherein the driving circuit is configured to select the first driving or the second driving in accordance with the driving target signal,
   wherein the driving target signal defines a target velocity of the optical element, and
   wherein the driving circuit selects the first driving when a target velocity is smaller than a threshold, and the second driving when the target velocity is equal to or larger than the threshold.
   wherein the driving circuit sets a threshold when the recording mode is set to the recording mode for recording a motion picture larger than a threshold when the recording mode is set to the recording mode for recording a still picture.

* * * * *